United States Patent [19]
Henmi

[11] Patent Number: 5,629,592
[45] Date of Patent: May 13, 1997

[54] ELECTRIC VEHICLE CONTROL DEVICE IN BOTH AN ALTERNATING CURRENT SECTION AND A DIRECT CURRENT SECTION

[75] Inventor: Takuma Henmi, Kanagawaken, Japan

[73] Assignee: Kabushiki Kaisha Toshiba, Kawasaki, Japan

[21] Appl. No.: 518,978

[22] Filed: Aug. 24, 1995

[30] Foreign Application Priority Data

Aug. 25, 1994 [JP] Japan ................... 6-200355

[51] Int. Cl.$^6$ ................... H02P 5/40; B60L 9/30
[52] U.S. Cl. ................... 318/107; 318/808; 318/441; 303/41
[58] Field of Search ................... 318/599–611, 105–110, 318/254, 138, 439, 139, 729, 798–817, 440–442, 500, 503, 504; 363/34, 37, 39–42, 44–48, 59–61

[56] References Cited

U.S. PATENT DOCUMENTS

| | | | |
|---|---|---|---|
| 3,461,366 | 8/1969 | Koppelmann | 318/51 |
| 3,736,480 | 5/1973 | Lee | 318/51 |
| 4,823,066 | 4/1989 | Yoshiki et al. | 318/798 |
| 5,214,367 | 5/1993 | Uesugi | 318/803 |
| 5,250,890 | 10/1993 | Tanamachi et al. | 318/811 |
| 5,442,271 | 8/1995 | Hatanaka et al. | 318/729 |

FOREIGN PATENT DOCUMENTS

| | | |
|---|---|---|
| 0594457 | 4/1994 | European Pat. Off. . |
| 61-273103 | 12/1986 | Japan . |
| 7-7808 | 1/1995 | Japan . |

OTHER PUBLICATIONS

Patent Abstract of Japan, vol. 12, No. 130, (E–603) (1988) and JP-A-62 254691, Mitsubishi Electric Corp. (1987).

*Primary Examiner*—Brian Sircus
*Attorney, Agent, or Firm*—Foley & Lardner

[57] ABSTRACT

While an electric vehicle is traveling in a DC section, a ripple component detecting unit detects a ripple component appearing on a filter capacitor voltage and adds the ripple component onto an inverter frequency reference in such manner as to cancel an influence in a motor current caused by the ripple component. On the other hand, while in an AC section, a damping control component detecting unit detects a magnitude of fluctuation of a DC power supplied from a DC power line as a damping control component and adds the component, like the ripple component in the AC section, onto the inverter frequency reference in such manner as to cancel an influence in the motor current caused by the damping control component. Consequently, an output current from the inverter which is to be supplied to the induction drive motor becomes very steady of ripple-free and it improves comfort for passengers on the electric vehicle.

9 Claims, 4 Drawing Sheets

ELECTRIC VEHICLE CONTROL DEVICE IN BOTH AN ALTERNATING CURRENT SECTION AND A DIRECT CURRENT SECTION

BACKGROUND OF THE INVENTION

The present invention relates to an electric vehicle control device in both an alternating current (AC) section and a direct current (DC) section. The electric vehicle employs a pulse width modulation (PWM) converter in a propulsion circuit for converting AC power supplied from the AC section to a constant DC power and a variable voltage variable frequency (VVVF) inverter for converting the DC power from the converter to a desired AC power for an induction drive motor. The electric vehicle also employs an inner DC supply line, which directly takes in the DC power from the DC section and supplies to the inverter.

As shown in FIG. 1, a conventional electric vehicle control device in both an AC section and a DC section is provided with a propulsion circuit comprising power supply switching circuit 6 for switching and taking in AC power in the AC section or DC power in the DC section through current collector 1, main transformer 7 for transforming the AC power supplied through current collector 1, PWM converter 2 connected to the secondary side of main transformer 7 through breaker unit 8 for converting the transformed AC power from main transformer 7 into a constant DC power, high speed circuit breaker 9 connected to a DC output terminal of power supply switching circuit 6, filter reactor 10, and filter capacitor 11 connected to the output of filter reactor 10 at a DC output side of PWM converter 2. The propulsion circuit further comprises VVVF inverter 3, a DC input side of which is connected to filler capacitor 11, and induction drive motor (IM) 4 driven by an AC output of VVVF inverter 3. The system is also provided with control circuit 12 for the purpose of gate control to PWM converter 2 and VVVF inverter 3, static inverter (SIV) 5 as an auxiliary power supply, motor speed detector 13 like a pulse generator (PG), voltage detector (V) 14 for detecting a voltage of filter capacitor 11, and motor current detector 15 for detecting a current of each phase line U, V and W distributed between VVVF inverter 11 and induction drive motor 4.

As shown in FIG. 2, the conventional control circuit 12 for gate control of converter 2 and inverter 3 comprises percent modulation operating unit (PMDOP) 12A for calculating a percent modulation which is to determine an output voltage of inverter 3 to be applied to induction drive motor (IM) 4 based on the voltage of filter capacitor 11, damping control component operating unit (DCCOP) 12B for calculating a magnitude of voltage fluctuation of filter capacitor 11, motor current reference operating unit (MCROP) 12C for calculating motor current reference IM* from motor speed reference V* and detected motor speed FR by motor speed detector 13, slip frequency operating unit (SFOP) 12D for calculating slip frequency FS* from the motor current reference IM* output from motor current reference operating unit 12C, and proportional-plus-integral (PI) motor current control component operating unit (PIMCOP) 12E for calculating a motor current control component from motor current reference IM* and effective motor current IM detected by motor current detector 15.

The control circuit 12 further comprises subtraction unit 12F for subtracting effective motor current IM from motor current reference IM*, first adder 12G for adding slip frequency FS* from SFOP 12D and the motor current control component from PIMOP 12E, second adder 12H for adding detected motor speed FR and the output of first adder 12G, third adder 12J for adding the damping control component from DCCOP 12B and calculated slip frequency FS in second adder 12H so as to output inverter frequency reference $f_{inv}^*$, pulse mode operating unit (PMOP) 12K for calculating a pulse mode, and PWM wave generating unit (PWMGN) 12M for generating an inverter gate control signal based on the percent modulation from PMDOP 12A, the output from PMOP 12K and inverter frequency reference $f_{inv}^*$.

The control circuit 12 controls gates provided in inverter 3 according to the inverter gate control signal which is generated by PWM wave generating unit 12M.

However, there are drawbacks in the conventional power control. device of the electric vehicle traveling in both the AC section and DC section. In general, VVVF inverter 3 is connected to the output terminal of PWM converter 2 and auxiliary load like static inverter (SIV) 5 is also connected to the output terminal of the converter 2 in the propulsion circuit of the electric vehicle as shown in FIG. 1. An influence of an input filter provided in SIV 5 and a transient behavior of SIV 5 trigger a resonance between a filter coefficient of VVVF inverter 3 and that of SIV 5, causing a ripple of the voltage of filter capacitor 11.

Further, since the electric vehicle travels in both the AC section and DC section, both coefficients of the filter reactor and filter capacitor are to be determined based on electrical characteristics of a power supply substation. While the car is traveling in the AC section with the filter capacitor of a pre-determined capacitance, the ripple voltage of twice higher frequency than that of the AC power supply usually appears on the voltage of filter capacitor 11. While traveling in the DC section, the voltage of filter capacitor 11 fluctuates according to the voltage fluctuation of the DC power supply, directly.

These ripples influence the results of calculation for the percent modulation, the damping control component and the pulse mode operation component because those are derived from calculations based on the voltage of the filter capacitor, causing ripple in the motor current to be controlled by this power control device and also causing the fluctuation of the motor torque. These ripple of the motor current and fluctuation of the motor torque lower comfort for passengers on the electric vehicle. Japanese publication of Patent Application Laid Open No. 62-254691, 1987, discloses a technique of removing the ripple appearing on the voltage of the inverter in order to resolve the drawbacks of the conventional power control system of the electric vehicle. However, the prior art reference is to be applied to the electric vehicle traveling solely in the AC power supply section. It does not disclose the technique for removing the voltage fluctuation of the filter capacitor caused by the voltage fluctuation of the DC power supply while traveling in the DC power supply section, which causes the fluctuation of the output of the inverter to be applied to the induction drive motor. Accordingly, an improvement of comfort for the electric vehicle traveling in both the AC and DC sections is still remained as a problem in the field.

Furthermore, the power control system is generally to be mounted on the electric vehicle so that it is required to be compact in size and light in weight. The size and mass of the PWM converter and VVVF inverter correlate with the magnitude of DC voltage and input/output current to be applied in each circuit element. The higher the rated DC voltage is raised, the larger the snubber loss and switching loss in the switching elements increase. Then, as the result, it becomes necessary to make peripheral circuit elements of the propulsion circuit larger in size and heavier in mass, and consequently to make a cooling system which is to be necessary for the propulsion circuit larger. Moreover, the larger the rated input/output current is raised, the larger elements the system comes to require, so that the steady loss of the elements increases and the size of the cooling system should be enlarged. Therefore, it is important to select a suitable magnitude of the DC voltage and the input/output current. However, in the conventional power control device, the voltage and current are determined based on the rated voltage of the DC section so that the requirement for downsizing the cooling system is still remained as a problem.

SUMMARY OF THE INVENTION

One of the objects of this invention as to an electric vehicle control device in both an AC section and DC section is to prevent a fluctuation of an output current from an inverter to be supplied to an induction drive motor by means of suppressing a fluctuation of a voltage applied to a filter capacitor and to improve comfort for the passengers while the vehicle is traveling in both the AC section and the DC section.

Another object of this invention is to downsize a cooling system which is to be necessary for a propulsion circuit.

The electric vehicle control device in both the AC section and DC section of this invention is characterized by a current collector for taking electric power from a power supply line, an AC-DC switch for switching an input power between an AC power from the AC section and a DC power from the DC section through the current collector, a transformer connected to an AC output of the AC-DC switch, a PWM converter connected to a secondary output side of the transformer for converting the AC power into a DC power, a filter capacitor connected to both a DC output terminal of the AC-DC switch and an output side of the PWM converter, a VVVF inverter, a DC input side of which is connected to the filter capacitor, an induction drive motor connected to an AC output side of the VVVF inverter, and a control circuit for controlling gates of the PWM converter and the VVVF inverter.

In the power control system set forth above, while the electric vehicle is traveling in the AC section, the control circuit operates so as to detect the ripple appearing on the filter capacitor voltage and to superimpose the detected ripple frequency on the frequency reference which is to be applied to the VVVF inverter for the purpose of suppressing the influence of the ripple appearing in the output current of the inverter to be supplied to the induction drive motor, and on the other hand, while in the DC section, it operates so as to detect the voltage fluctuation of the filter capacitor as the damping control component caused by the voltage fluctuation of the DC power supply and to superimpose the frequency of the detected fluctuation on the frequency reference which is to be applied to the VVVF inverter for the same purpose as in the AC section and consequently, it can make the output current of the VVVF inverter to be applied to the induction drive motor coincident with the steady motor current reference according to the motor speed reference without any influences by the ripple appearing on the voltage of the filter capacitor and improve comfort for passengers on the electric vehicle.

Furthermore, the power control device this invention can make any circuit elements that are necessary for the snnuber circuit and the cooling system compact by limiting the set value of the output voltage of the PWM converter up to the maximum voltage of the nominal voltage of the DC power supply line and also by limiting the current flowing through the propulsion circuit and the voltage to be applied to that circuit within the maximum magnitude of the expected fluctuation range of the DC voltage while the electric vehicle is traveling either in the AC section or in the DC section.

DETAILED DESCRIPTION OF THE PREFERRED EMBODIMENTS

Figure 1:
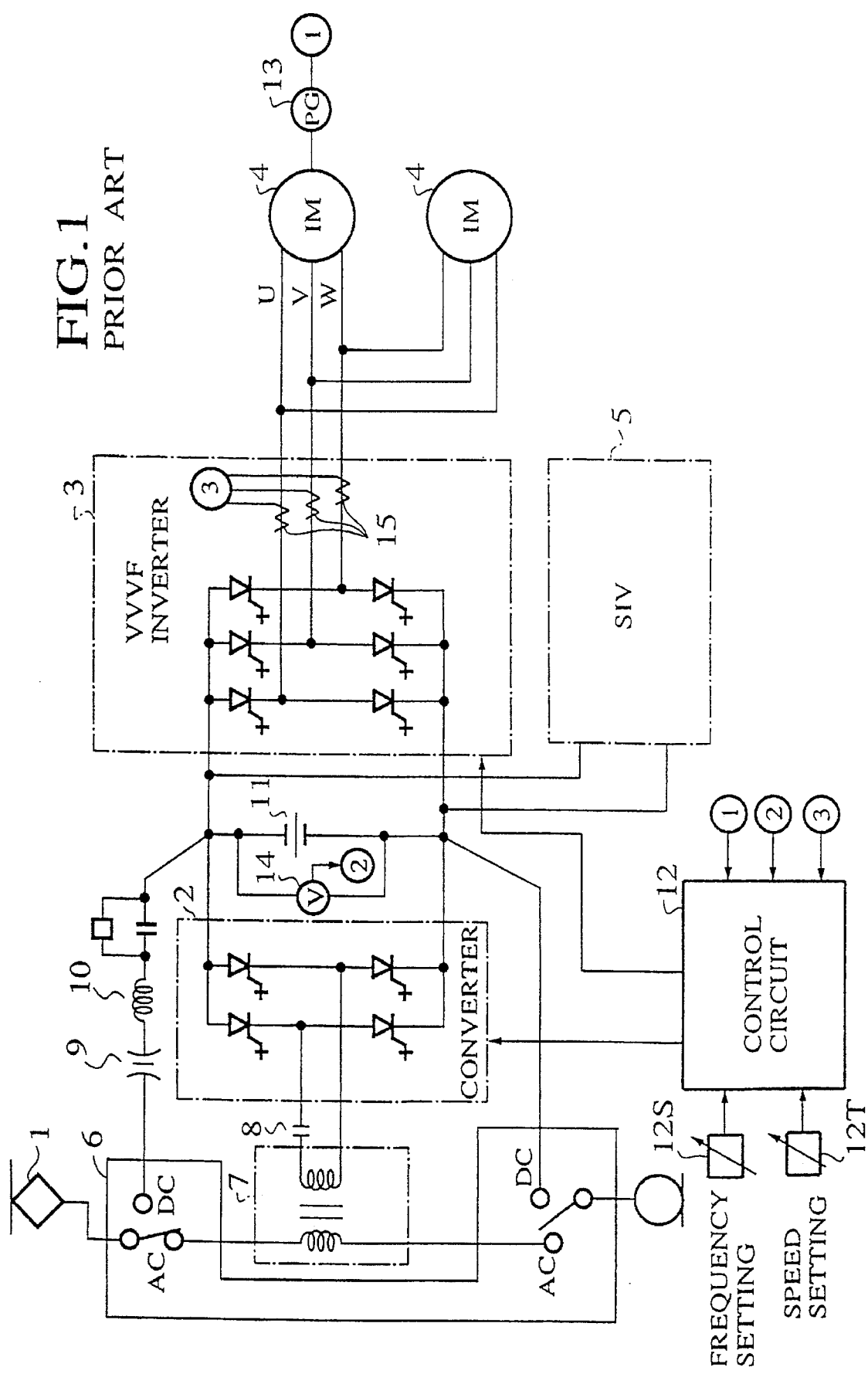
FIG. 1 is a block diagram showing a propulsion circuit of an electric vehicle traveling in both an AC supply section and DC supply section of a prior art.
Figure 2:
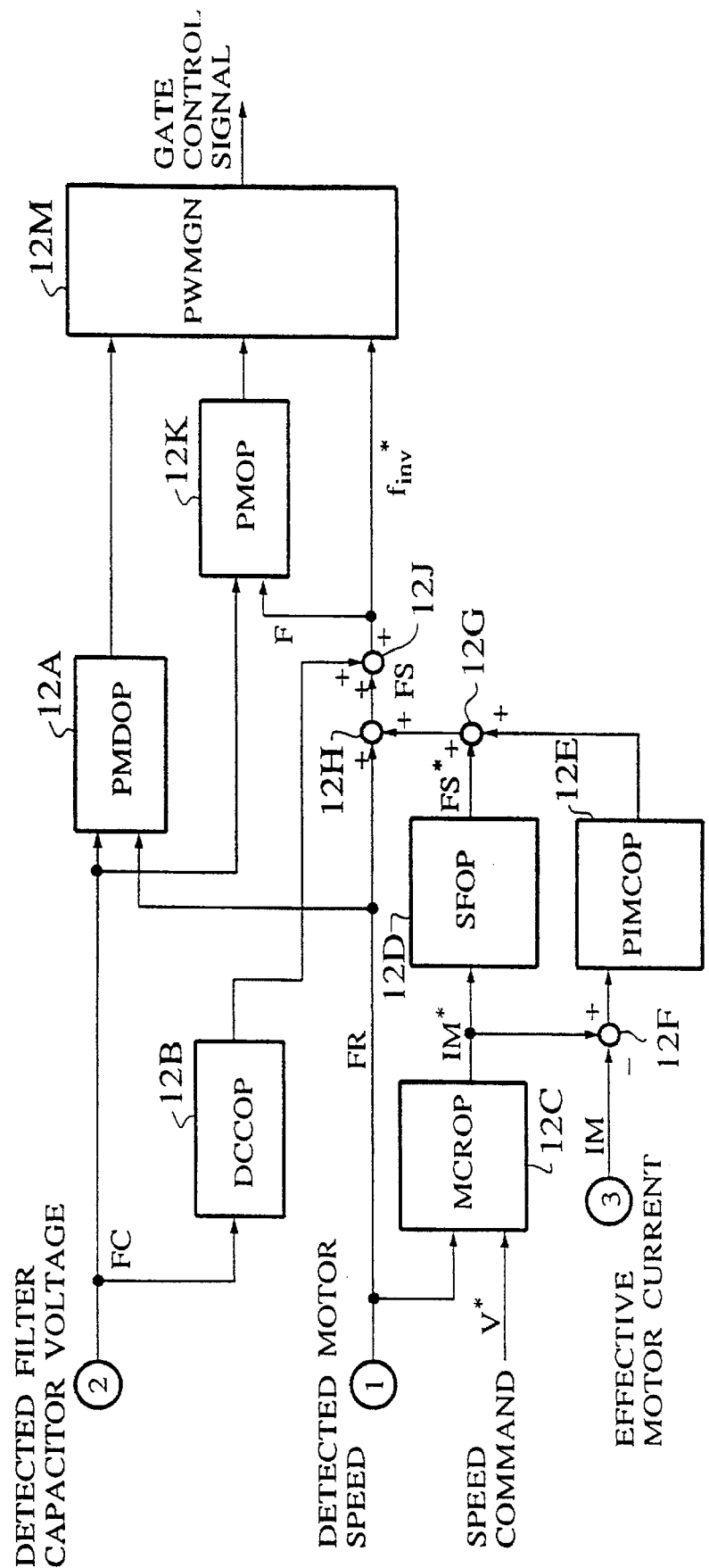
FIG. 2 is a block diagram showing a control circuit of the power control device in the propulsion circuit of the prior art.
Figure 3:
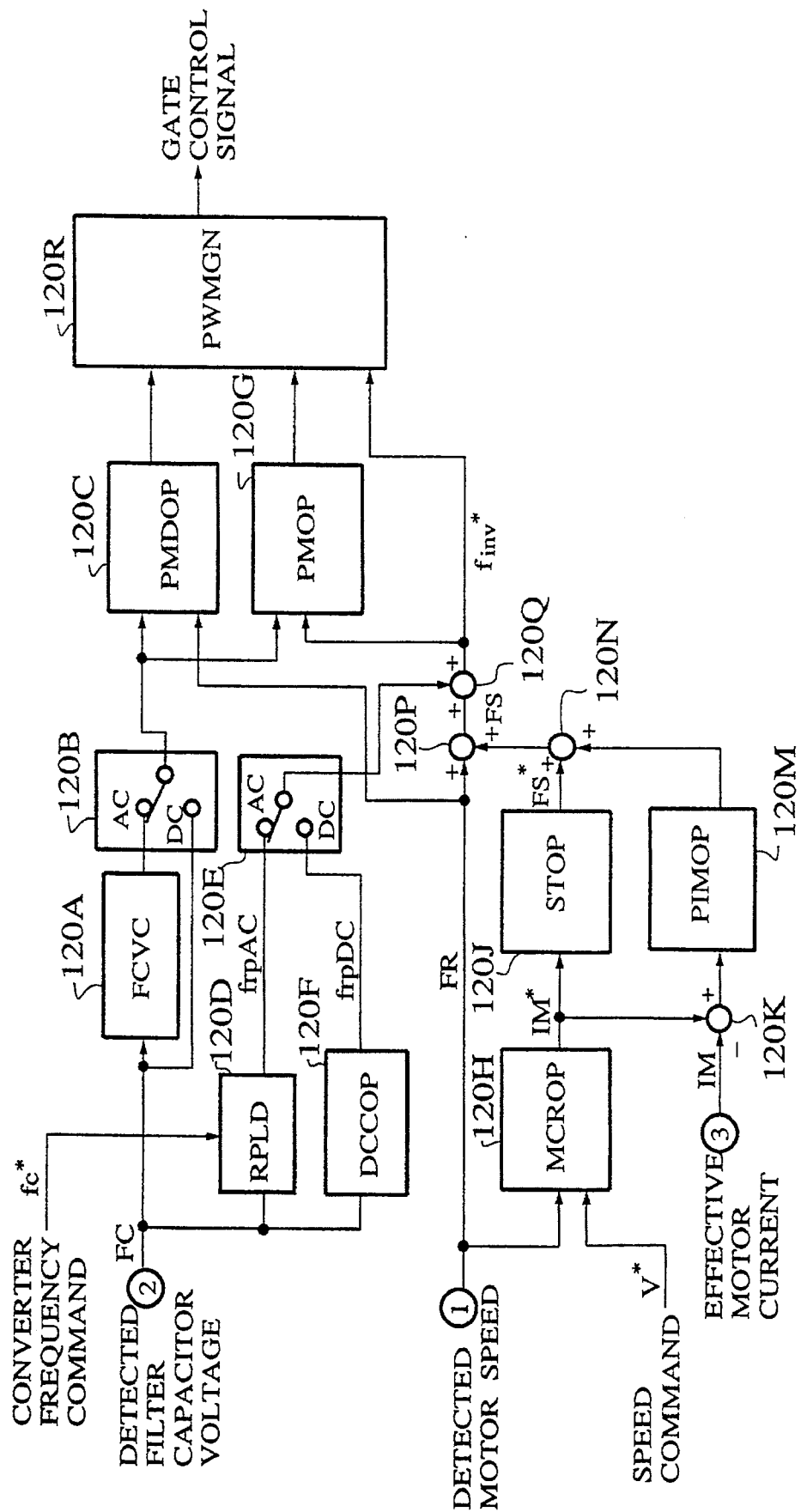
FIG. 3 is a block diagram showing a control circuit according to an embodiment of this invention.

Control circuit 120 shown in FIG. 3 is to be changed to the conventional control circuit 12 of the propulsion circuit of the prior art shown in FIG. 1. This control circuit 120 comprises filter capacitor voltage control unit (FCVC) 120A, AC-DC switch 120B, percent modulation operating unit (PMDOP) 120C, ripple component detecting unit (RPLD) 120D, damping control component switch 120E, damping control component operating unit (DCCOP) 120F and pulse mode operating unit (PMOP) 120G.

Filter capacitor voltage control unit 120A takes in detected voltage FC of filter capacitor 11 and calculates voltage, control component of the filter capacitor. AC-DC switch 120B cooperates with power supply switching circuit 6 (shown in FIG. 1) and switches an output to percent modulation operating unit 120C between AC terminal and DC terminal. Modulation degree operating unit 120C calculates a percent modulation for VVVF inverter 3 based on detected voltage FC of filter capacitor 11 and detected motor speed FR. Ripple component detecting unit 120D detects ripple $f_{rpAC}$ of the voltage of PWM converter 2 from detected voltage FC of filter capacitor 11. Damping control component switch 120E switches its output between ripple $f_{rpAC}$ detected by ripple component detecting unit 120D and damping control component $f_{rpDC}$ being output from damping control component operating unit 120F. Damping control component operating unit 120F calculates damping control component $f_{rpDC}$ from detected filter capacitor voltage FC. Pulse mode operating unit 120G calculates a frequency reference of PWM carrier wave for VVVF inverter 3 based on detected voltage FC of filter capacitor 11 and inverter frequency reference $f_{inv^*}$.

Control circuit 120 further comprises motor current reference operating unit (MCROP) 120H, slip frequency operating unit (FSOP) 120J, subtraction unit 120K, PI motor current control component operating unit (PIMOP) 120M, first adders 120N, second adder 120P and third adder 120Q, and PWM wave generating unit (PWMGN) 120R.

Motor current reference operating unit 120H calculates motor current reference IM* based on detected motor speed FR and motor speed reference V*. Slip frequency operating unit 120J calculates slip frequency reference FS* based on motor current reference IM*. Subtraction unit 120K derives a deviation between detected effective motor current IM and motor current reference IM*, and PI motor current control component operating unit 120M calculates a control component of motor current based on deviation being output from subtraction unit 120K. First adder 120N adds slip frequency reference FS* and the control component of motor current. Second adder adds the result value of first adder 120N and detected motor speed FR, and outputs slip frequency FS. Third adder 120Q adds slip frequency FS from second adder 120P and an output from damping control component switch 120E, and outputs inverter frequency reference $f_{inv*}$ to PWM wave generating unit 120R.

PWM wave generating unit 120R generates PWM gate control signal based on the percent modulation from percent modulation operating unit 120C, the pulse mode from pulse mode operating unit 120G and inverter frequency reference $f_{inv*}$ from third adder 120Q.

Here, converter frequency reference fc* is set by frequency setting unit 12S and motor speed reference V* is set by speed setting unit 12T as both units are shown in FIG. 1.

The control circuit having the structure set forth above works as below. In the AC section, AC-DC switch 120B is turned to the AC terminal and damping control component switch 120E is also turned to the AC terminal, while in the DC section, AC-DC switch 12013 is turned to the DC terminal and switch 120E is also turned to the DC terminal. This turning operation is carried out coupled with the turning action of power supply switching circuit 6 shown in FIG. 1.

While in the AC section, detected voltage signal FC of filter capacitor 11 by voltage detector 14 shown in FIG. 1 is input simultaneously to filter capacitor voltage control unit 120A and ripple component detecting unit 120D. Filter capacitor voltage control unit 120A has a characteristic as shown in expression (1) below.

$$G(s) = \frac{1}{1+T \cdot s} \quad (1)$$

$$T = \frac{K_2}{f}$$

where
f: ripple frequency
$K_2$: coefficient

Figure 4:
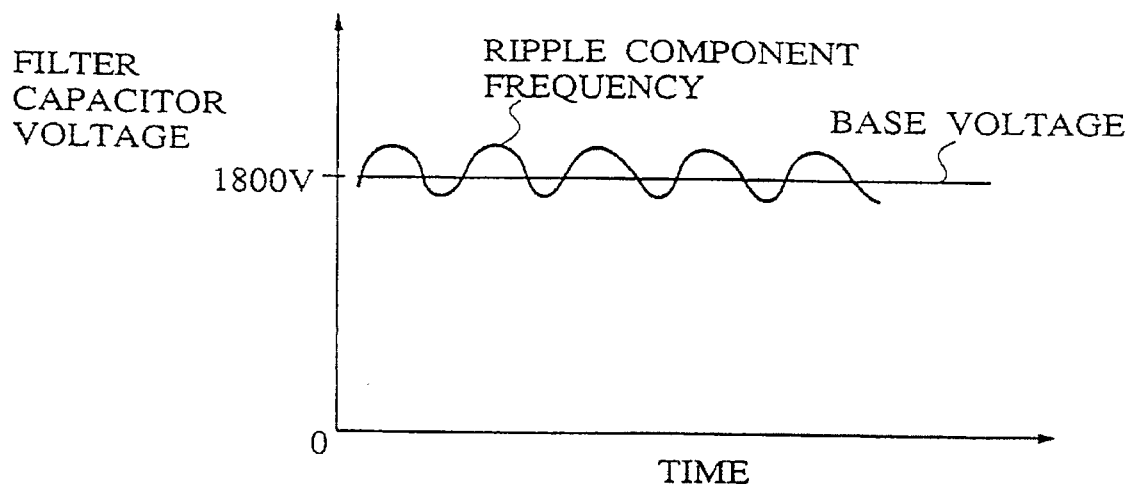
FIG. 4 is a voltage wave form of a filter capacitor of this invention.
Figure 5:
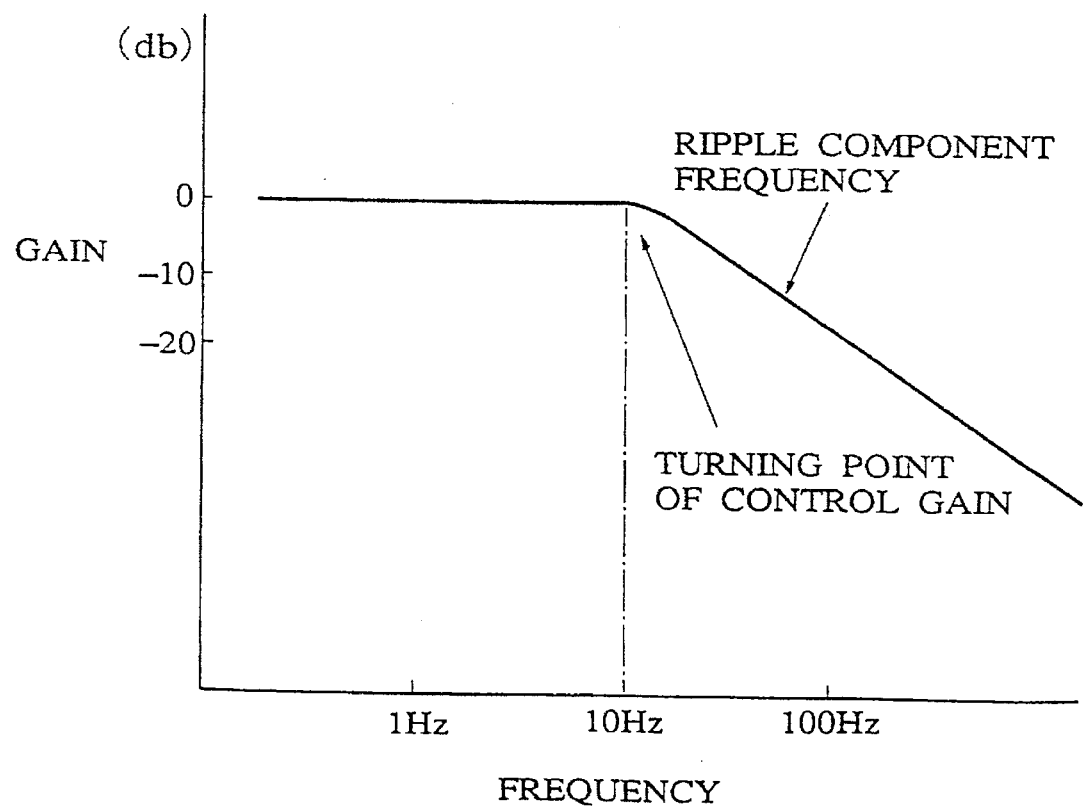
FIG. 5 is a Bode diagram of a filter capacitor voltage control unit in this invention.

Filter capacitor voltage control unit 120A detects the wave form of detected filter capacitor voltage FC as shown in FIG. 4, and adequately adopts coefficient $K_2$ in expression (1) so as to reduce ripple frequency that is caused by operation of SIV 5 and others and appears on detected filter capacitor voltage FC. The characteristic of this filter capacitor voltage control unit 120A is like that of shown in the Bode diagram in FIG. 5. FIG. 5 shows that the characteristic of filter capacitor voltage control unit 120A gives a large reduction rate over 10–20 Hz range of the ripple frequency so that it can reduce the influence of the ripple over the voltage of filer capacitor 11.

The voltage signal output through filter capacitor voltage control unit 120A is applied to percent modulation operating unit 120C along with detected motor speed FR. In percent modulation operating unit 120C, the percent modulation for VVVF inverter 3 is calculated and output to the PWM wave generating unit 120R. In the AC section, ripple component detecting unit 120D mainly comprising of a band pass filter detects ripple component $f_{rpAC}$ from comparison between detected voltage FC of filter capacitor 11 and converter frequency reference fc*. This ripple component detecting unit 120D derives the frequency component that is double the converter frequency reference fc* as ripple component $f_{rpAC}$ riding on filter capacitor voltage FC and outputs component $f_{rpAC}$ to third adder 120Q in order to correct the control of the motor current. For example, when converter frequency reference fc* is set to 50 Hz, the ripple component detecting unit 120D outputs ripple component $f_{rpAC}$ of 100 Hz frequency, that is double of converter frequency reference fc*, and when fc* is set to 60 Hz, then it outputs ripple component $f_{rpAC}$ of 120 Hz frequency to third adder 120Q in order to add to slip frequency FS. On the, other hand, in the DC section, damping control component operating unit 120F calculates voltage fluctuation $f_{rpDC}$ from detected filter capacitor voltage FC by means of time differential operation, and output the result to third adder 120Q. Damping control component switch 120E switches to output ripple component $f_{rpAC}$ from ripple component detecting unit 120D or damping control component $f_{rpDC}$ from damping control component operating unit 120F cooperating with AC-DC power supply switching circuit 6 and, in third adder 120Q, component $f_{rpAC}$ or $f_{rpDC}$ is added onto slip frequency reference FS from second adder 120P.

The motor current IM of induction drive motor 4 in the constant torque region is defined as expression (2) below.

$$IM = K_3 \cdot FS \quad (2)$$

Further, torque T of induction drive motor 4 is defined as expression (3).

$$T = K_4 \cdot \frac{IM^2}{FS} \quad (3)$$

where
IM: detected motor current
$K_3$, $K_4$: proportional constants
FS: slip frequency As is understood from expressions (2) and (3), suppressing ripple fluctuation of the torque T of induction drive motor 4 can be achieved by increasing slip frequency FS by the amount corresponding to that of the increase of motor current IM. Hence, in this invention, switching and adding operation of ripple compensation component $f_{rpAC}$ or $f_{rpDC}$ onto slip frequency FS according to traveling section is introduced in order to suppress the influence of ripple component involved in detected voltage FC of filter capacitor 11 against motor current IM.

The operation for slip frequency FS is carried out as below. Motor current reference operating unit 120H calculates motor current reference IM* from detected motor speed FR and motor speed reference V*. Slip frequency operating unit 120J calculates slip frequency reference FS* from motor current reference IM* and outputs frequency reference FS* to first adder 120N. On the other side, subtraction unit 120K calculates the deviation between motor current reference IM* and effective motor current IM detected by motor current detector 15, and PI motor current control component operating unit 120M calculates motor current control component from the deviation from subtraction unit 120K and outputs to first adder 120N. First adder 120N adds the motor current control component onto slip frequency reference FS*, and in second adder 120P, detected motor speed FR is further added onto the output from first adder 120N and the result is output to third adder 120Q as slip frequency FS.

Consequently, third adder 120Q adds slip frequency FS from second adder 120P and ripple compensation component $f_{rpAC}$ or $f_{rpDC}$ through damping control component switch 120E and gets frequency reference $f_{inv}*$ for VVVF inverter 3, and outputs this frequency reference $f_{inv}*$ to PWM wave generating unit 120R.

PWM wave generating unit 120R calculates PWM gate control signal based on the percent modulation from percent modulation operating unit 120C, the frequency reference for PWM carrier wave from pulse mode operating unit 120G and frequency reference $f_{inv}*$ from third adder 120Q, and outputs this gate control signal to VVVF inverter 3 for gate control.

Consequently, this invention can prevent the ripple fluctuation of output current from the VVVF inverter to the induction drive motor by means of suppressing the fluctuation of the voltage appearing on the filter capacitor, and as the consequent, can eliminate discomfort for the passengers on the electric vehicle caused by the torque fluctuation, and results in an improvement of comfort for the passengers.

Hereinafter, the second preferred embodiment is described. The second embodiment features a method of setting a DC voltage of output from the PWM converter 2 shown in FIG. 1 to the maximum value of a nominal DC voltage of the DC power supply line. In the DC supply section, it is necessary for a propulsion circuit of an electric vehicle to work within a range of fluctuation of the DC voltage supplied from the DC supply line because the voltage of the DC supply line and the DC voltage in the propulsion circuit is equivalent. Therefore, in designing voltage resistance of each elements to be employed in the propulsion circuit and cooling characteristic for the propulsion circuit, it is necessary to consider the maximum value of the DC voltage within its fluctuating range. By contrast, in the AC supply section, it is possible to select the output voltage from the PWM converter 2 to an arbitrarily desired value by adequately setting characteristic of main transformer 7 and PWM converter 2. Therefore, it is preferable to minimize an input/output current of PWM converter 2 as small as it can achieve by means of raising the output voltage from PWM converter 2 up to the maximum value of the DC supply section, or the nominal voltage of the section. As the result it becomes possible to reduce the maximum current flowing through PWM converter 2, and accordingly to miniaturize each element to be employed in the snnuber circuit and the cooling system. This merit can be achieved to its maximum when setting the output voltage of PWM converter 2 to that of the maximum voltage of the DC supply line, or the nominal voltage of the section.

As set forth above, since it is possible to set the output voltage of PWM converter 2 by means of selecting adequate parameters for both main transformer 7 and PWM converter 2, the output voltage of PWM converter 2 can be set to the value equivalent to the expected maximum voltage of the DC supply line, or nominal voltage of the DC supply section. For instance, when the rated voltage of the DC section is set to 1500 V and the permitted range of voltage fluctuation is within 900–1800 V, the rated voltage in the DC stage of PWM converter 2 is to be set to 1800 V.

By this setting above, the output current I from PWM converter 2 is determined according to expression (4) below, $$P = V \cdot I \cdot K_1 \qquad (4)$$

where

V: DC voltage $K_1$: coefficient of PWM converter 2 involving efficiency and power factor (about 0.8)

There, if the power of PWM converter 2 is kept constant, the output current from PWM converter 2 can be reduced to 1500/1800 (=83.8%) while the DC voltage is raised from 1500 V to 1800 V. Moreover, if the current is reduced, breaking current can be reduced and requisite capacitance of the snubber capacitor can also be reduced. This fact shows that miniaturizing circuit components to be employed in the propulsion circuit is realizable.

I claim:

1. An electric vehicle control device in both an alternating current (AC) section and a direct current (DC) section comprising a current collector for taking in an electric power from a power supply line;

alternating current-direct current (AC-DC) switching means for switching between an AC power supply and a DC power supply supplied from the power supply line through the current collector according to the AC section or the DC section in which the electric vehicle is traveling;

a main transformer, a primary side of which is connected to an AC output side of the AC-DC switching means, for transforming the AC power supply;

a power converter connected to a secondary side of the main transformer for converting an AC output power from the main transformer to a DC power;

a filter capacitor connected to both a DC output terminal of the AC-DC switching means and a DC output terminal of the power converter;

an inverter, a DC input terminal of which is connected to the filter capacitor;

an induction drive motor connected to an AC output terminal of the inverter; and a control circuit for carrying out a pulse width modulation (PWM) gate control for the inverter;

wherein the control circuit is further comprising a speed detector of the induction drive motor;

a motor current detector for detecting an effective current to be supplied to the induction drive motor from the inverter;

slip frequency reference operating means for calculating a slip frequency based on a speed reference given from outside, a motor speed detected by the speed detector and the effective motor current detected by the motor current detector;

ripple component detecting means for detecting a ripple component from a filter capacitor voltage as a ripple component of the output power of the power converter while the electric vehicle is traveling in the AC section;

damping control component detecting means for detecting a magnitude of a voltage fluctuation of the filter capacitor as a damping control component while the electric vehicle is traveling in the DC section;

an adder for adding the ripple component from the ripple component detecting means or the damping control component from the damping control component detecting means onto the slip frequency reference from the slip frequency reference operating means and for outputting for the inverter as an inverter frequency reference; and other switching means correlating with the AC-DC switching means for switching between the ripple component from the ripple component detecting means and the damping control component from the damping control component detecting means and supplying to the adder.

2. A electric vehicle control device according to claim 1, wherein the control circuit further comprising capacitor voltage detecting means for detecting a voltage of the filter capacitor, the means having a transfer characteristic of reducing a ripple component with a predetermined frequency which is expected to appear in the filter capacitor voltage; and percent modulation operating means for calculating a percent modulation of the inverter based on the voltage of the filter capacitor detected by the capacitor voltage detecting means and the motor speed detected by the speed detector.

3. A electric vehicle control device according to claim 1, wherein a PWM converter is used as the power converter.

4. A electric vehicle control device according to claim 3, wherein the ripple component detecting means is characterized by detecting a ripple component with a double frequency of that of a frequency reference to the PWM converter.

5. A electric vehicle control device according to claim 1, wherein the power converter is set to output the limited voltage up to the maximum value of an nominal voltage of the DC supply line.

6. A method of power control of an electric vehicle traveling in both an AC section and a DC section comprising the steps of AC-DC switching between an AC-power and a DC power supplied from a power supply line through a current collector according to the AC section or the DC section in which the electric vehicle is traveling;

transforming the AC power supplied from the power supply line while the electric vehicle is traveling the AC section;

converting an AC power once transformed by the transforming step into a DC power through a power converter;

rectifying the DC power by a filter reactor and a filter capacitor;

converting a rectified DC power into an AC power for an induction drive motor through an inverter;

detecting a motor speed of the induction drive motor;

detecting a effective motor current to be supplied to the induction drive motor from the inverter;

calculating a slip frequency based on a motor speed reference given from outside, the detected motor speed and the detected effective motor current;

detecting a ripple component of a filter capacitor voltage while the electric vehicle is traveling in the AC section;

detecting a magnitude of a voltage fluctuation of the filter capacitor as a damping control component while the electric vehicle is traveling in the DC section;

correlating with the AC-DC switching step and switching between the detected ripple component and the detected damping control component so as to output the detected ripple component or the detected damping control component; and adding the detected ripple component or the detected damping control component onto the slip frequency reference and outputting the result for the inverter as an inverter frequency reference.

7. A method of power control of an electric vehicle according to claim 6, further comprising the steps of detecting a voltage of the filter capacitor;

reducing a ripple component with a predetermined frequency which is expected to appear in the filter capacitor voltage; and calculating a percent modulation of the inverter based on the detected voltage of the filter capacitor and the detected motor speed.

8. A method of power control of an electric vehicle according to claim 6, wherein the detecting step of the ripple component is characterized by detecting a ripple component with a double frequency of that of a frequency reference to the power converter.

9. A method of power control of an electric vehicle according to claim 6, further comprising the step of setting an output voltage of the power converter to the limited voltage up to the maximum value of an nominal voltage of the DC supply line.

* * * * *